US005173862A

United States Patent [19]

Fedirchuk et al.

[11] Patent Number: 5,173,862

[45] Date of Patent: Dec. 22, 1992

[54] ENVELOPE STAMP IMPRINTING DEVICE

[76] Inventors: Peter M. Fedirchuk; Peter D. Fedirchuk, both of 196 Second Avenue, Ottawa, Ontario, Canada, K1S 2H7

[21] Appl. No.: 538,665

[22] Filed: Jun. 15, 1990

[30] Foreign Application Priority Data

Jun. 29, 1989 [CA] Canada ........ 604418

[51] Int. Cl.[5] ........ G07B 17/02; G06F 15/20

[52] U.S. Cl. ........ 364/464.02; 235/381

[58] Field of Search ........ 235/381; 364/464.02, 364/464.03

[56] References Cited

U.S. PATENT DOCUMENTS

| | | | |
|---|---|---|---|
| 3,635,297 | 1/1972 | Salava | 364/464.03 X |
| 4,628,457 | 12/1986 | Manduley | 364/464.03 X |
| 4,635,204 | 1/1987 | Jones et al. | 364/464.02 |
| 4,780,835 | 10/1988 | Sievel et al. | 364/464.02 X |
| 4,868,757 | 9/1989 | Gil | 364/464.02 X |
| 4,923,022 | 5/1990 | Hsieh | 364/464.03 X |
| 4,940,887 | 7/1990 | Sheng-Jung | 364/464.03 X |
| 4,962,454 | 10/1990 | Sansone et al. | 364/464.02 |
| 5,007,084 | 4/1991 | Materna et al. | 235/381 X |

FOREIGN PATENT DOCUMENTS

| | | |
|---|---|---|
| 1175568 | 10/1984 | Canada . |
| 1217287 | 1/1987 | Canada . |

*Primary Examiner*—Parshotam S. Lall

*Assistant Examiner*—Edward R. Cosimano

*Attorney, Agent, or Firm*—Dickinson, Wright, Moon, Van Dusen & Freeman

[57] ABSTRACT

There is provided a device for printing an impression of both postal codes and postage stamps on envelopes which comprises a frame having a slot to receive an envelope so that the envelope is in position to be appropriately printed with an impression of a postal code and postage stamp. Sensors are provided within the slot to indicate when the envelope is appropriately positioned for printing an impression of the postal code and postage stamp. A printer is provided within the frame to print an impression of a predefined postal code in machine readable form and a variable postage amount subtracted from an electronic fund of stored postage on an envelope appropriately positioned within the slot. A keyboard on the frame enables the selecting of both a postal code and a postage amount. A CPU is associated with the keyboard and programmed to store the electronic postage fund and enable it to be appropriately added to with additional postage or subtracted from when an impression of the postage is printed on an envelope. The CPU also controls the operation of the printer so that an impression of a selected postage and postal code are printed on the envelope. The invention also envisages the adaptation of the device to receive bank credit cards to be read and financial transactions to be carried out by way of a telephone line, through communication with the device's CPU and a remote CPU.

9 Claims, 7 Drawing Sheets

TO ENCODE AN ENVELOPE

TO RECEIVE MORE POSTAGE

ENVELOPE STAMP IMPRINTING DEVICE

FIELD OF THE INVENTION

The present invention relates to a device for printing an impression of postal codes and postage stamps on envelopes, and more particularly relates to such a device which may be used domestically or commercially to facilitate the printing of an impression of postal codes and stamps on envelopes.

BACKGROUND OF THE INVENTION

Surveys which have been conducted into the stamp purchasing patterns and preferences among Canadian households have revealed that 70% of the households in large cities that have over $35,000 per year in earnings would change their stamp buying habits for greater convenience even if it meant that at least 10 stamps had to be purchased at a single time.

Postage meters are well-known. Postage stamping machines, particularly for commercial use, tend to be large and complex, with many mechanical parts, costly, and noisy in use. They cannot be readily adapted to a home market. Such devices generally comprise a frame having a slot to receive an envelope placed in the slot, and guide means to direct an envelope to a printing station, and, at that station, means to print the envelope with an appropriate postage stamp. A manual clock means within the device allows for the stamp to be appropriately dated; mechanical counter means within the device enables the postage printed to be drawn from a mechanical postage fund, so that postage will not be printed once that fund has been exhausted, and that fund may be periodically replenished as required by physically taking the device to a predetermined post office.

Canadian Patent No. 1,217,287 of Kling, et al issued Jan. 27, 1987 describes and illustrates such a stamping device combined with a telephone. The selected postage printed on an envelope placed in a slot in the base of the telephone is monitored and passed by a telephone line to a post office account.

Canadian Patent No. 1,175,568 of Duwell, et al issued Oct. 2, 1984 describes and illustrates a remote postage meter recharging system for commercial postage meters whereby a data centre, coupled to the postage meter by telephone line, may update the record of the user stored at the data centre with respect to postage used in the meter.

Banking from automated tellers is a fairly common practice these days. The main reason for their popularity is convenience. Most machines are available 24 hours per day, seven days per week and are housed indoors in shopping malls, bank lobbies and convenience stores, for example.

However, except for a simple cash withdrawal, there are major disadvantages. The user must gather their banking papers together and go outside of their house to use a machine. And in some cases there are lines of people waiting to use the particular machine and at times, the machine is inoperable.

SUMMARY OF THE INVENTION

In accordance with the invention there is provided a device for printing of postal codes in machine readable form and an impression of postage stamps on envelopes. The device comprises a frame having a slot to receive an envelope so that the envelope will be in position to be appropriately printed with a postal code and an impression of a postage stamp. Means are provided within the slot to indicate when the envelope is appropriately positioned within the slot for printing of the postal code and postage stamp. Printing means are further provided within the frame to print a predefined postal code in machine readable form and a variable postage amount subtracted from an electronic fund of stored postage on an envelope appropriately positioned within the slot. Manually operable selection means, preferably alphanumeric keyboard means, are provided on the frame for selecting a code and a postage amount. Means coupled to the manually operable selection means store a postage fund electronically and enable it to be appropriately added to with additional postage or subtracted from when the postage is printed on an envelope. CPU means are associated with the manually operable selection means, postage fund storing means and printing means to control the operation thereof, the CPU means being programmed to convert postal code information fed to it from the manually operable selection means, into machine readable code at the printing means. Visual display means are associated with the CPU means and postage fund storing means to selectively display a selected postal code, selected postage amount or the balance of the fund of postage amount as desired. Electronic clock means are associated with the CPU means and the printing means to generate an appropriate stamp date for an impression of the stamp being printed on the envelope.

In a preferred embodiment of the invention, the device is associated with a telephone modem means so that postage or information may be supplied to the device from a remote source by telephone lines.

In yet a further preferred embodiment of the device according to the present invention, access is provided to central computers for banking transactions. In this embodiment, the device comprises a further slot to receive a bank credit card with a magnetic strip thereon. Means are provided, associated with the slot, to read and store information stored on the magnetic strip. The manually operable selection means on the frame is designed to further select, as required, account numbers, dollar amounts and authorization codes. The CPU means are coupled to the reading means, the manually operable means on the frame to select account numbers, dollar amounts and authorization codes, the display means and the telephone modem, and the CPU means are programmed to translate the manual selection data and transmit it to an appropriate central computer at a remote source for further processing. The visual display means, as required, selectively displays said manual section data and transmitted data from said remote source.

The device according to the present invention enables the printing of postal code information in machine readable form, as well as an impression of the stamping of proper postage, on an envelope. Using a telephone modem, postal code information may be readily stored in a central location, for example according to telephone numbers, and postal code information then fed to the device from a remote source for notation and storage and for printing on an envelope. Each transaction may be simultaneously transmitted through the telephone line and recorded in a local computer if desired. In this manner, the user can be billed for stamps used and/or for rental of the device.

In the embodiment of the invention which incorporates an additional slot through which a bank credit card or any card with a magnetic strip can be passed, the device can read the data on the magnetic strip for storage within its memory.

Using the modem means described above, this information can then be transmitted to a central computer for processing banking functions. The alpha-numeric keyboard means described above would be used to define transaction and dollar amounts.

It is an object of the present invention to provide a postage imprinting device particularly adapted for use in homes or small businesses which is able to not only print an envelope with an impression of a postage stamp, but also print that envelope with a postal code in a machine readable form.

It is a further object of the present invention to provide such a device which is economical to construct and simple to use and eliminates the need to go to a post office for replenishment.

It is a further object of one embodiment of this invention, in conjunction with providing a means to print postal codes and postage stamp impressions on envelopes, to permit banking capabilities from the convenience of one's home, office or business. These capabilities would include paying bills and determining account balances.

BRIEF DESCRIPTION OF THE DRAWINGS

These and other objects and advantages of the invention will become apparent upon reading the following detailed description and upon referring to the drawings in which.

Figure 1:
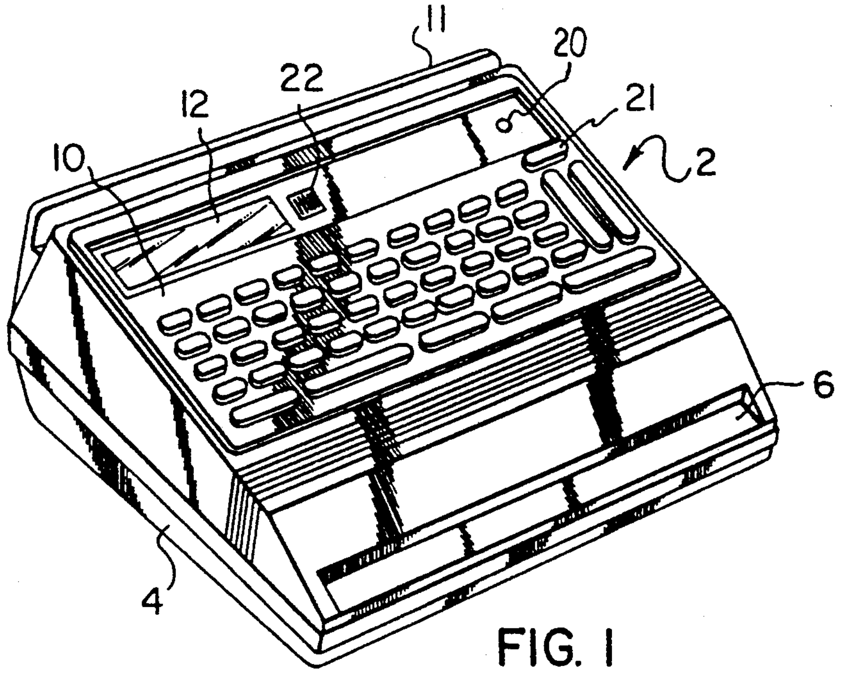
FIG. 1 is a perspective view of an example embodiment of the device in accordance with the present invention.

While the invention will be described in conjunction with example embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE INVENTION

In the drawings similar features have been given similar reference numerals.

Turning to FIG. 1, there is illustrated a device 2 for printing postal codes and postage stamps on envelopes and performing banking functions in accordance with the present invention. Device 2 comprises a frame 4 having a slot 6 for receiving an envelope. Means 9 such as optical sensors (phantom, FIG. 2), are preferably provided to indicate when the envelope is appropriately positioned within the slot for printing of the postal code and postage on it. An LED 20 (FIG. 1) is located on the right front corner of the face of the device and lights to indicate to the user when the envelope is in the correct position. Slot 11 is for receiving a conventional plastic bank credit card with a magnetic data-containing strip, and contains conventional means 11*a* for reading data on that strip.

Figure 2:
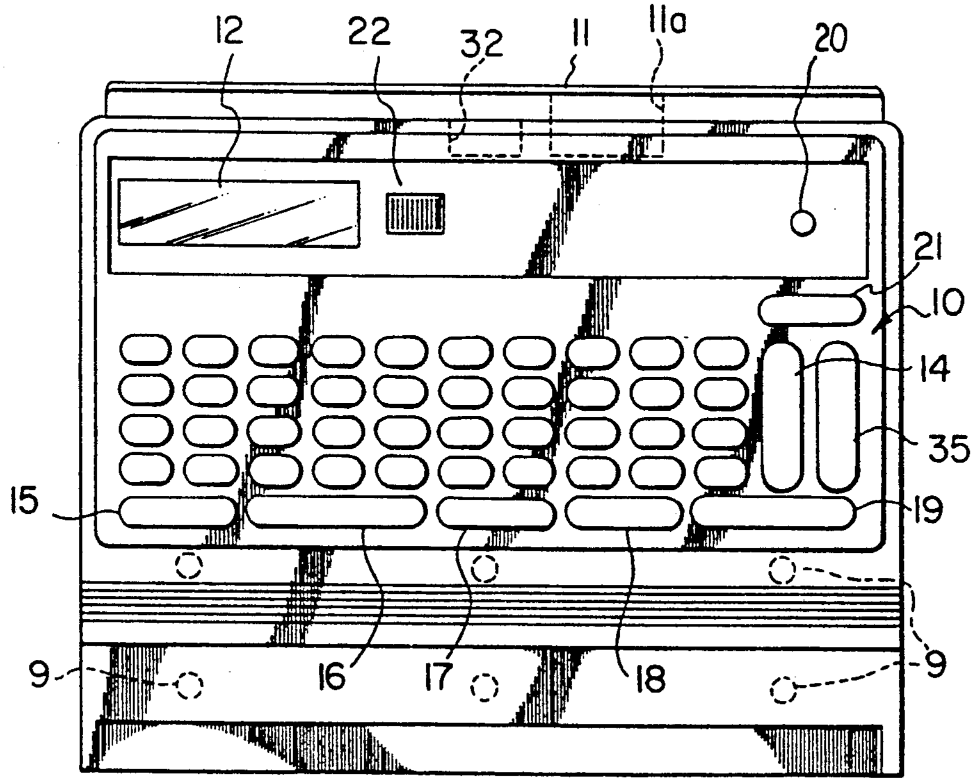
FIG. 2 is a plan, schematic view of the device of FIGURE I showing in more detail the keyboard and information display areas of the device.

As can be seen in FIGS. 1 and 2, the exterior of the frame is provided with an alpha-numeric keyboard 10, an alpha-numeric display area 12, for example LCD, an on-off switch 14, a cancel key 15, request postage key 16, set time key 17, postage amount key 18, print key 19 and banking key 21 respectively.

LCD 12 is preferably a 16 by 1 alpha-numeric display. Alpha-numeric keys 10 are preferably a moulded rubber alpha-numeric custom keypad. If desired, an audio feedback system may be provided, having a small speaker 22 to provide an auditory feed back to the user. For example, one beep may be used to indicate a "go-ahead" or "okay" response by the device. Two beeps in short succession might indicate "an error" or "try again" type of response. A single beep of different tone might be used to indicate when a key has been pressed. It would sound every time a key was actuated.

Keyboard 10 is an attempt at defining which keys might be required by software menus, to be described in more detail subsequently, comprising the user interface. It is not intended that the illustrated keyboard necessarily be an exact keyboard layout, since the specific layout of the keyboard will be dictated based on aesthetics, ergonomics, and the desired functionality of the device.

Figure 3:
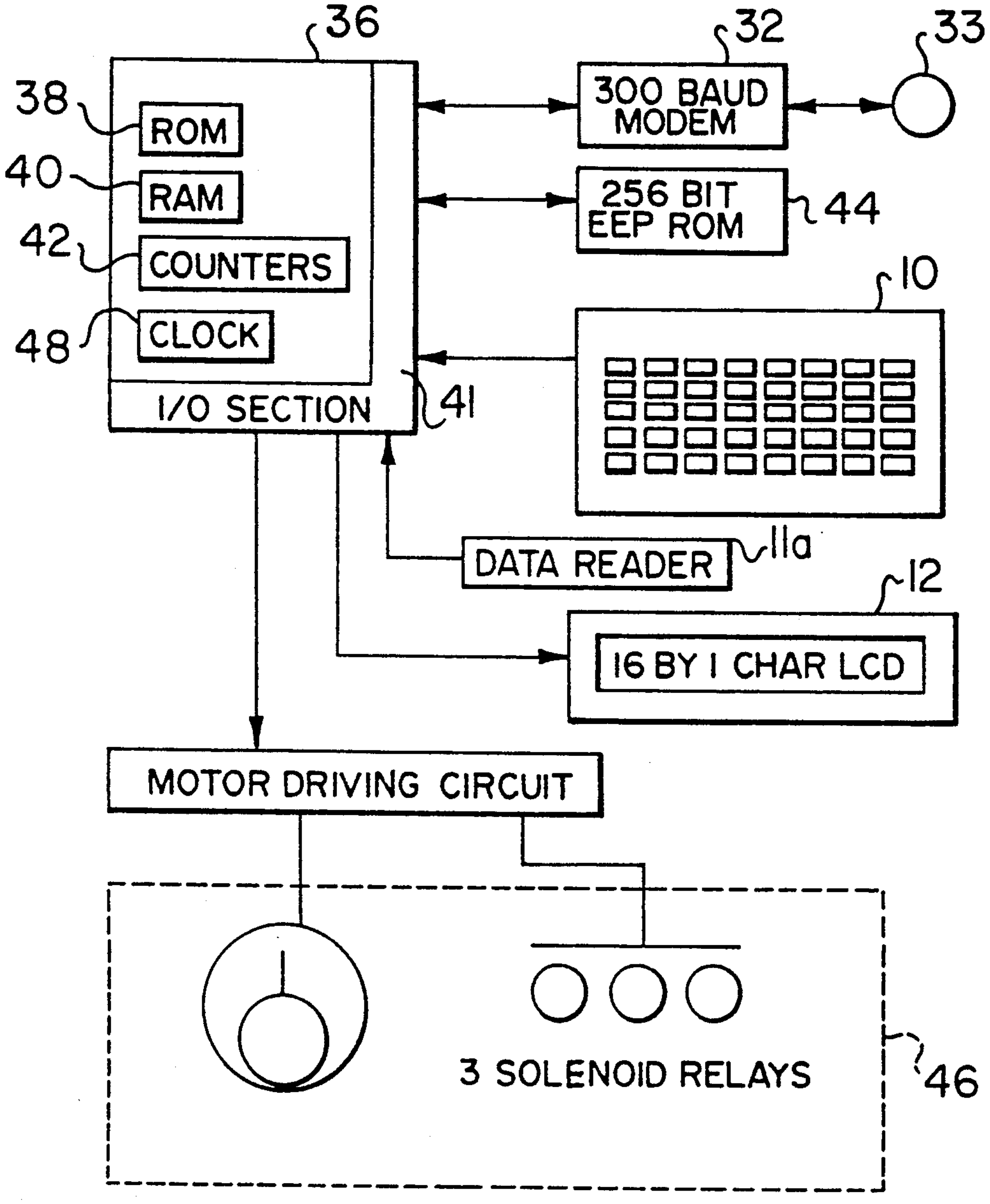
FIG. 3 is a schematic view of the essential components of the device.

A built-in telephone modem 32 is preferably also provided for the device, e.g. to access banking functions or to enable the user to purchase stamps from a central remote source by telephone line, to add to a postage fund stored in the device. Modem 32 is a single chip modem and is used to communicate with a variety of host servers over standard telephone lines. It uses a rotary tone method rather than faster pulse code method. This allows use of the product anywhere in the country. The product is arranged to disconnect whenever a call comes into that location as a result of the new call waiting features found in many households. If the device is required to disconnect it will perform re-try at least three times before giving an error message to the user. The modem is preferably 300 baud and would be accompanied with a standard plug in four-pin telephone connector interface to connect to a conventional telephone plug 33 (FIG. 3). The device would normally be powered by an external AC adapter (not illustrated).

The button 16, marked "Request Postage" will allow the user to request device 2 to call a central, remote computer and up-load new postage via the telephone line through modem 32 and telephone plug 33. If a user requires, he or she can determine a postal code by pressing key 35 "Get Code". When "Get Code" key 35 is activated, microcomputer 36 (hereinafter "CPU") (FIG. 3) within the device will ask for a phone number of the destination address and will contact the central, remote computer through modem 32 via plug 33 and the phone line to retrieve the corresponding postal code.

Button 21, marked "Banking" will allow the user to convert the CPU from postage to banking functions (and vice versa), to call and connect to a central remote computer and carry out such transactions as paying bills, that is, electronically transfer funds from the user's account to that of a debtor's account. In this regard CPU 36 (FIG. 3) is associated with keyboard 10, data storing means 38, 40, 42 and 44, display area 12 and transmitter (modem) means 32 to control the operation thereof, the CPU being programmed to translate and transmit data from the manual selection means and then receive, interpret, store and display information and messages on the display area 12.

Hardware and Firmware Description

Turning to FIG. 3 there is illustrated a schematic view of the components of the device in accordance with the present invention, and their interrelationship. With respect to CPU 36, a single chip 8 bit microprocessor is preferred in order to keep unit and production costs low. The microprocessor will have on board ROM 38, RAM 40 and I/0 ports 41 in order to communicate to the outside. Alpha-numeric (or other) postal codes fed in from the keyboard 10 are converted, by appropriate software associated with CPU 36, to machine readable code, such as bar code currently used in the postal system, at the printing plotter mechanism 46. The software controlling the operation of CPU 36 is preferably written in assembly language and mask programmed into production versions of a chip.

Postage available counters 42 and 44 (where the electronic postage funds are kept) and a real time clock 48 are also associated with CPU 36. Device 2 will always be powered as long as it is connected to the AC adapter, which in turn is plugged in. The electronics are kept in low power "sleep mode" until a key is pressed at which time they power up fully and respond to the user. Only real time clock 48 would be active while the device would be in "sleep mode". The CPU 36 updates every second in order to update the time and day which is determined by reading an internal timer (not illustrated) within the CPU itself. When the CPU 36 updates the time, it will also send the new time to the LCD 12 so that the user will always see the correct time even though the unit is operationally turned off. LCD 12 has its own on-board controller (not illustrated). The CPU 36 communicates with it via a four bit interface (not illustrated). It is preferred that the display is always left on so that the unit will appear to be on.

A non-volatile 256 bit serial EEPROM memory chip 44 is used to hold any information that CPU 36 does not want to lose during a power failure situation. These chips are very reliable and are not expensive. It is used to store critical parameters such as unit serial number, the identification code (PIN) of the user and the amount of postage remaining, etcetera. It is made tamper proof by encoding the data using an appropriate form of encryption scheme.

Keyboard 10 and data reading means 11*a* are connected directly to the I/0 section 41 of the microprocessor to allow data generated thereby to be scanned under software control.

Printer Description

Figure 4:
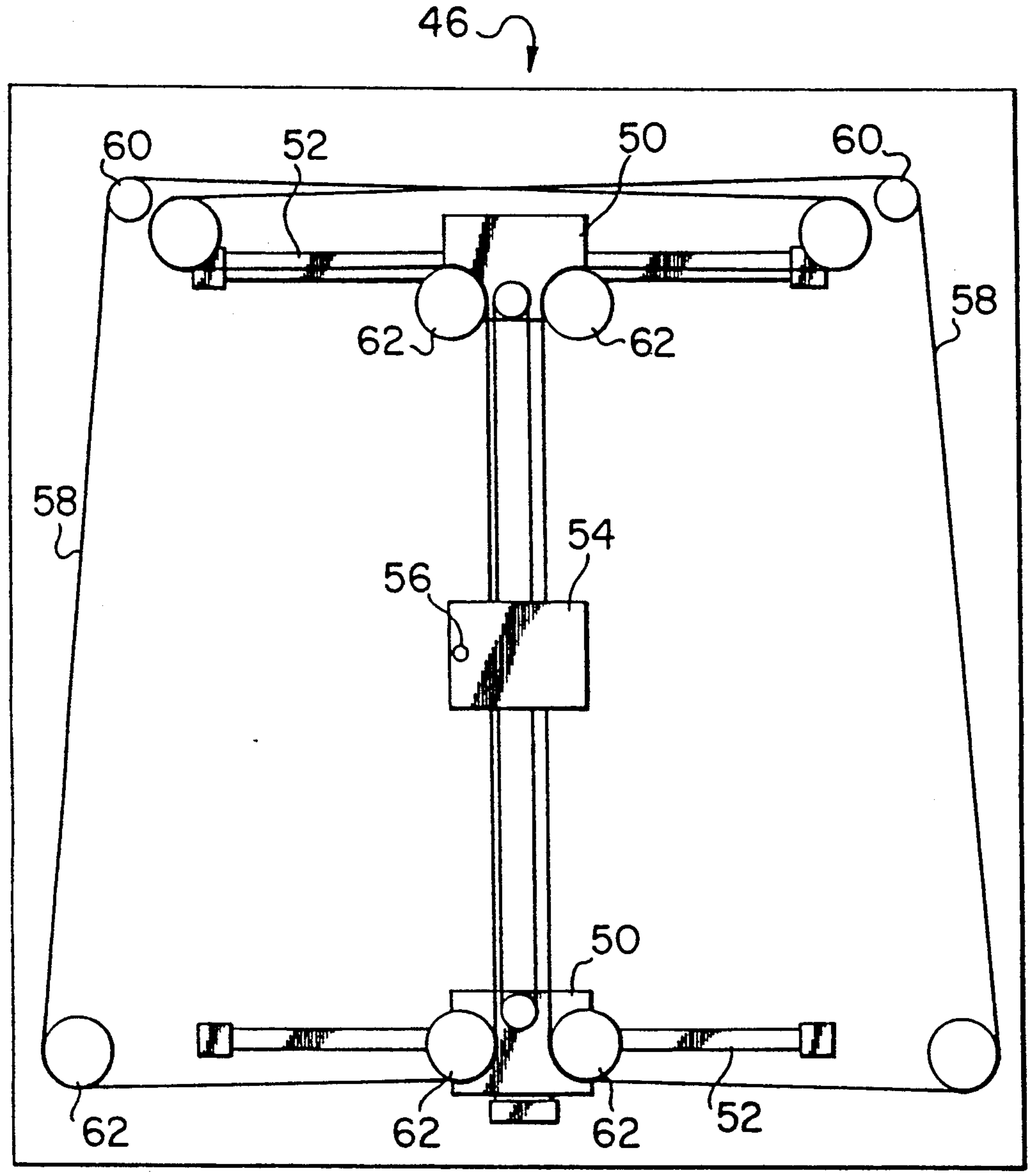
FIG. 4 is a schematic view of an example embodiment of the printing mechanism of the device of FIG. 1.

FIG. 4 describes and illustrates a schematic view of the printing plotter mechanism 46, shown schematically in FIG. 3, this plotter mechanism being controlled by signals from CPU 36 to print a machine readable postal code and an impression of the postage information on an envelope. While different types of printers may be used, for instance thermal printers, impact/dot matrix or X-Y plotters, the latter appears to be the most cost effective way of realizing a good printer and build a custom pin plotter. As can be seen in FIG. 4, plotter mechanism 46 comprises a main carriage 50 sliding laterally from side-to-side on polished steel tubes 52 mounted within the frame 4 of the device. A secondary carriage 54 slides in a direction perpendicular thereto on main carriage 50 and holds a pen 56 and its associated mechanism. Movement of the carriages, and hence of pen 56, is controlled by wires 58 driven by motors 60. The drive of the two motors is controlled through two sets of buffers (not illustrated) which translate the signals from CPU 36 into signals with enough power to run the motor windings. Wires 58 transform the motor rotation of motors 60 into linear motions of the carriages. Wires 58 are appropriately positioned about pulleys 62 as illustrated. Pen 56 itself, is mounted on carriage 54 so that it will have a variable height to enable it to move on and off the letter. A spring (not illustrated) is used to provide pen pressure.

Software Menu Description

CPU 36 of device 2 is programmed with a software menu, for example, as follows:

1. Ready (Time)
2. Enter Identification Code No. (PIN)
3. Incorrect Code
4. Type Postal Code
5. Postal Code=
6. Invalid Postage Code
7. Insert Envelope
8. Press Print
9. Bad Letter Position
10. Postage Amount=$
11. Insufficient Postage Available
12. Device Error
13. Call For Service
14. Enter Postage Rate
15. Enter Postage Amount
16. Account Balance=
17. Insufficient Funds
18. Account Number To Be Paid
19. Your Account Number
20. Enter Payment Amount
21. Please Verify
22. Your Branch Number
23. OK To Pay?

The following description will outline the use of device 2 once a designated key has been pressed. The written description is in pseudo-code format and will refer to the above-noted menu descriptions.

Every day the unit will self-check itself for a malfunction and, if one occurs, it would display a message "Device Error" (menu 12) followed by a message, "Call For Service" (menu 13).

If the user presses set time key 17, the software will execute a stream of menus which would allow the person to alter the time and date. Once they are finished, the computer would return the user to exactly where he or she left off. This key can be pressed at any time. The same holds true for postage amount key 18 which can be pressed at any time. Once it is activated, the computer will display for two seconds the current amount of postage available in the machine. At the end of this time, it will return exactly to where it left off. Cancel key 15 will erase the last key entry.

Use Description

```
* Display the time, menu #1 (current time)
* WHILE "on" key is not pressed. Wait forever 1
  second interrupt
      If interrupt then update time storage and
      display END
* UNTIL the amount is entered
  {DO
      * Display menu #2 (ENTER PIN #)
      * UNTIL PIN number is correct
        {DO
            UNTIL 4 keys are entered
                DO get new key
                END
            IF entered code is valid PIN #
                THEN display menu #4
                ELSE display menu #3
        END}
      [At this stage the user is prompted to enter for
      example a 6-character postal code]
          * UNTIL postal code is correct
            {DO
                UNTIL 6 keys have been entered
                    {DO
                    get new key
                    END}
                IF 6 characters entered are a valid
                code
                    THEN display menu #7 (insert
                    envelope)
                    ELSE display menu #6 (invalid
                    postal code)
            END}
      [The user has been invited to enter the envelope]
          * WHILE envelope is not inserted correctly
            (optical sensors are used)
            {DO
                Display warning menu #9 (bad ltr
                position)
            END}
          * Display menu #15 (enter pstg amount)
          * Get entered amount (user enters amount
            followed by enter key)
          * IF amount is not allowed due to insufficient
            funds
                THEN display menu #11 (insuf pstg.
                avail)
                ELSE
                    [The amount is valid and the
                    envelope is in position]
                    * Display menu #8 (Press Print
                      Key 19)
                    * WHILE printing key is not
                      pressed
                          DO nothing
                    * Start printing (cancel key
                      would terminate printing)
                    * Decrement available postage
                      stored in EEPROM
      END} go back to menu #4 (enter another postal code)
```

There would be another menu structure which would come up should the user wish to get more postage. It would have various error messages such as "Bad line, try again" and "Postage denied". The first one would be used if an incoming call is present on a line which has the call waiting feature or if there is a bad line, etcetera. The second message would be given if the central host server has been instructed that the user is not allowed more stamps due to unpaid bills etcetera. When a user activates the retrieve postage feature the unit would know the telephone of the central computer since it would be stored in EEPROM 44. This number could be programmed in by the local distributor of the device, using a 5 password type of arrangement. There would be another menu structure which would come up when the user wished to perform banking transactions on activation of key 21. Messages would provide or ask for account balances, account numbers to be paid, remaining balance and insufficient funds; for example.

FIGS. 5 through 8 are various logic flow diagrams showing the functions of the instructional control program which is stored in CPU 36 and in its various memories; ROM 38; RAM 40; EE PROM 44.

Figure 5:
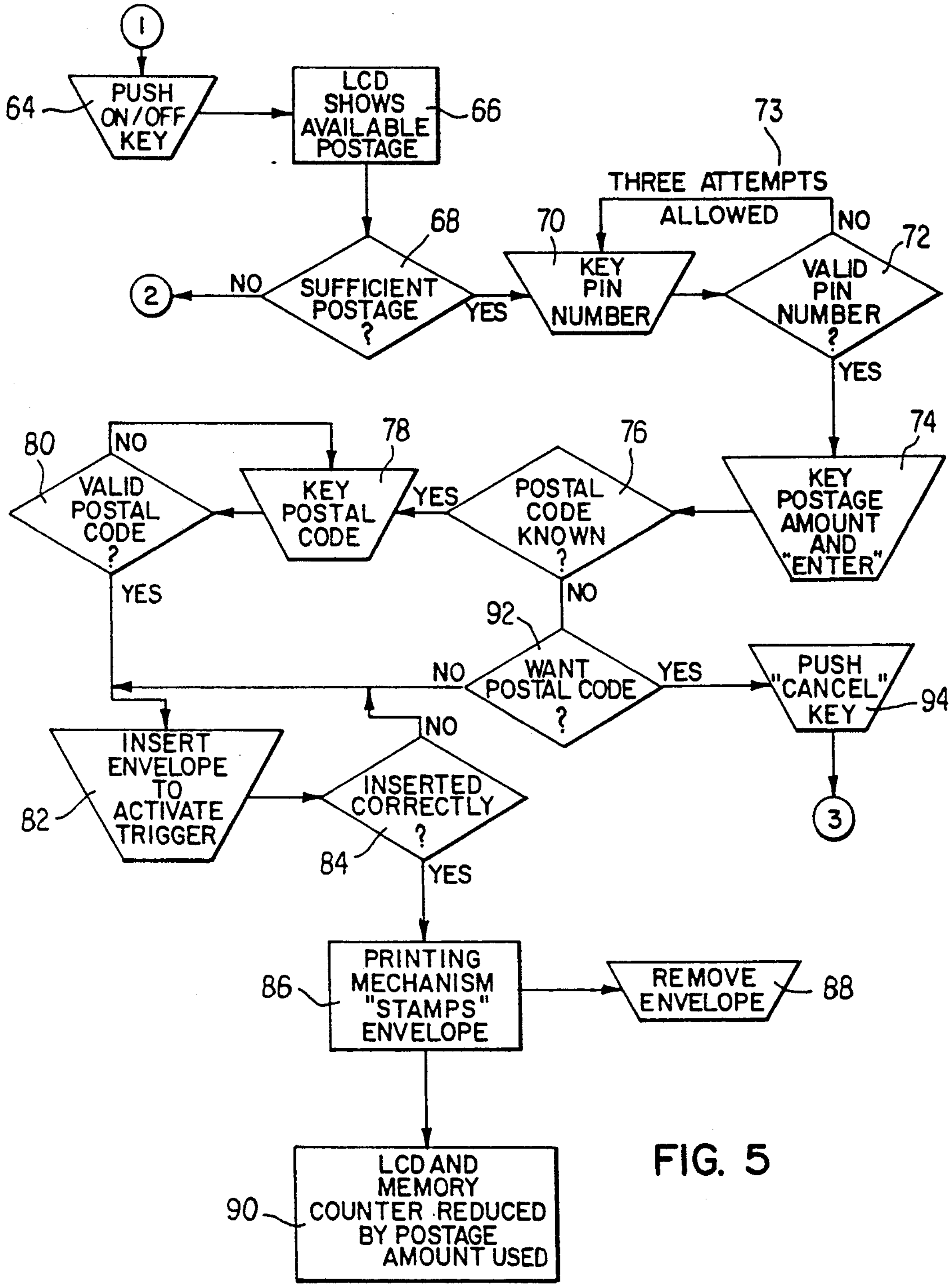
FIGS. 5, 6, 7 and 8 are respectively schematic diagrams of the operational steps and logic of the device of FIG. 1, respectively to encode an envelope, to receive more postage, to receive postal code information and to perform banking functions.

In FIG. 5, the unit is in a ready state or "sleep mode" as the power is on at all times. The unit 2 is brought out of its "sleep mode" and into an operational mode when the on-off switch 14 is depressed 64. The LCD 12 then shows the postage available 66 when postage available key 18 is depressed. The user now decides if there is sufficient postage 68 to meet their immediate needs. If there is sufficient postage, the Personal Identification Number (PIN) is keyed 70 on keyboard 10. The CPU 36 determines if the PIN is valid 72. If invalid, the user is notified via LCD 12 and attempts 73 to key the valid PIN. After three attempts (73), the unit 2 will return to its "sleep mode". When the right PIN is keyed 72, the CPU 36 displays on LCD 12 a prompt for the postage amount desired which the user keys 74. If the postal code is known 76, then user keys it 78 on keyboard 10 and the code is displayed on LCD 12 for confirmation. At the same time, CPU 36 checks the postal code for a correct arrangement of characters to determine its validity 80. If not valid, the LCD 12 displays a message and the user keys the correct postal code 78. With a valid postal code, CPU 36 sends a message via LCD 12 to insert the envelope 82 into slot 6. By sliding the envelope along the internal chamber of the unit 2, the envelope becomes positioned correctly 82 for printing. A message on LCD 12 confirms when the envelope is positioned correctly 84, the user pushes the print key 19 and the printing takes place 86 by printing mechanism 46. After the printing is finished, the envelope is removed 88. At the same time the appropriate memory in CPU 36 is reduced 90 by the amount of postage used 74.

If the postal code is not known 76, then the user can continue to have the envelope encoded 92 without a postal code by inserting the envelope 82 into slot 6 and continue with processes 84, 86, 88 and 90 as described above. If the postal code is desired 92, the cancel key 15 is pushed 94 and the user proceeds with the process described in FIG. 7 and no other processes in FIG. 5 take place.

Figure 6:
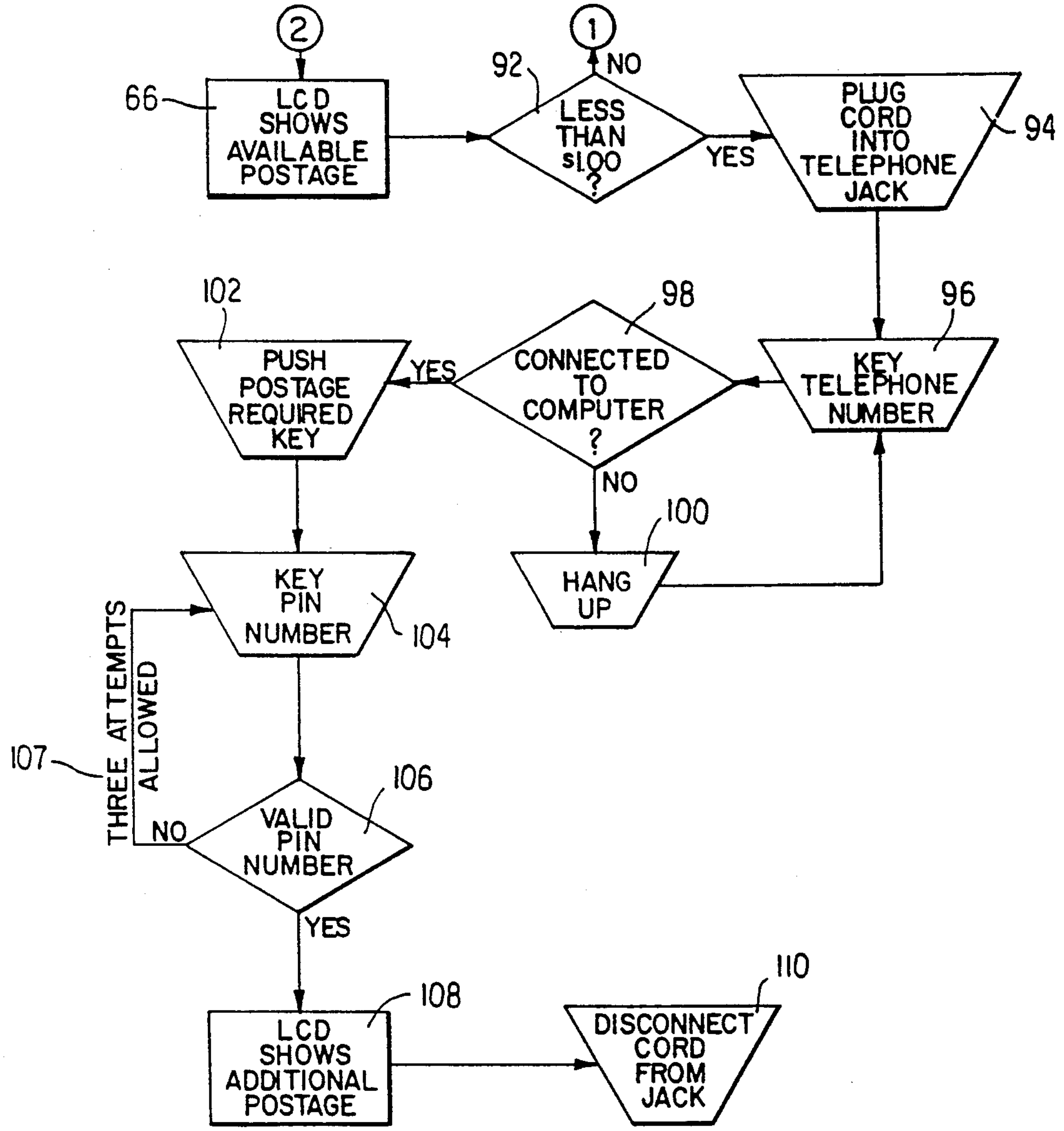

If there was insufficient postage 68, then the user would push the request postage key 16 and proceed with the process described in FIG. 6.

In FIG. 6, by pushing the request postage key 16, CPU 36 displays the postage available on LCD 12. If there is less than $1.00 worth 92, the user may get additional postage, otherwise the user could continue with process 70 in FIG. 5. To get additional postage the user ensures that the unit 2 is plugged 94 into a telephone jack 33. The phone number of a computer is keyed 96 and the CPU 36 informs the user via LCD 12 when the connection is made 98 via modem 32. If the connection is not successful, the user hangs up 100 and trys again 96. With a successful connection 98, the user pushes the postage request key 16 in step 102. CPU 36 then prompts via LCD 12 for the PIN which is keyed 104. CPU verifies the PIN and notifies the user of its validity 106. If not valid, the user can make three attempts (107) to key a valid PIN. If still not valid, the CPU 36 will return unit 2 to its "sleep mode". If the PIN is valid, then the CPU 36 accepts the additional postage downloaded by the connected computer via modem 32 and jack 33. CPU 36 then informs the user via LCD 12 of the amount of postage 108. The user then disconnects 110 from jack 33.

Figure 7:
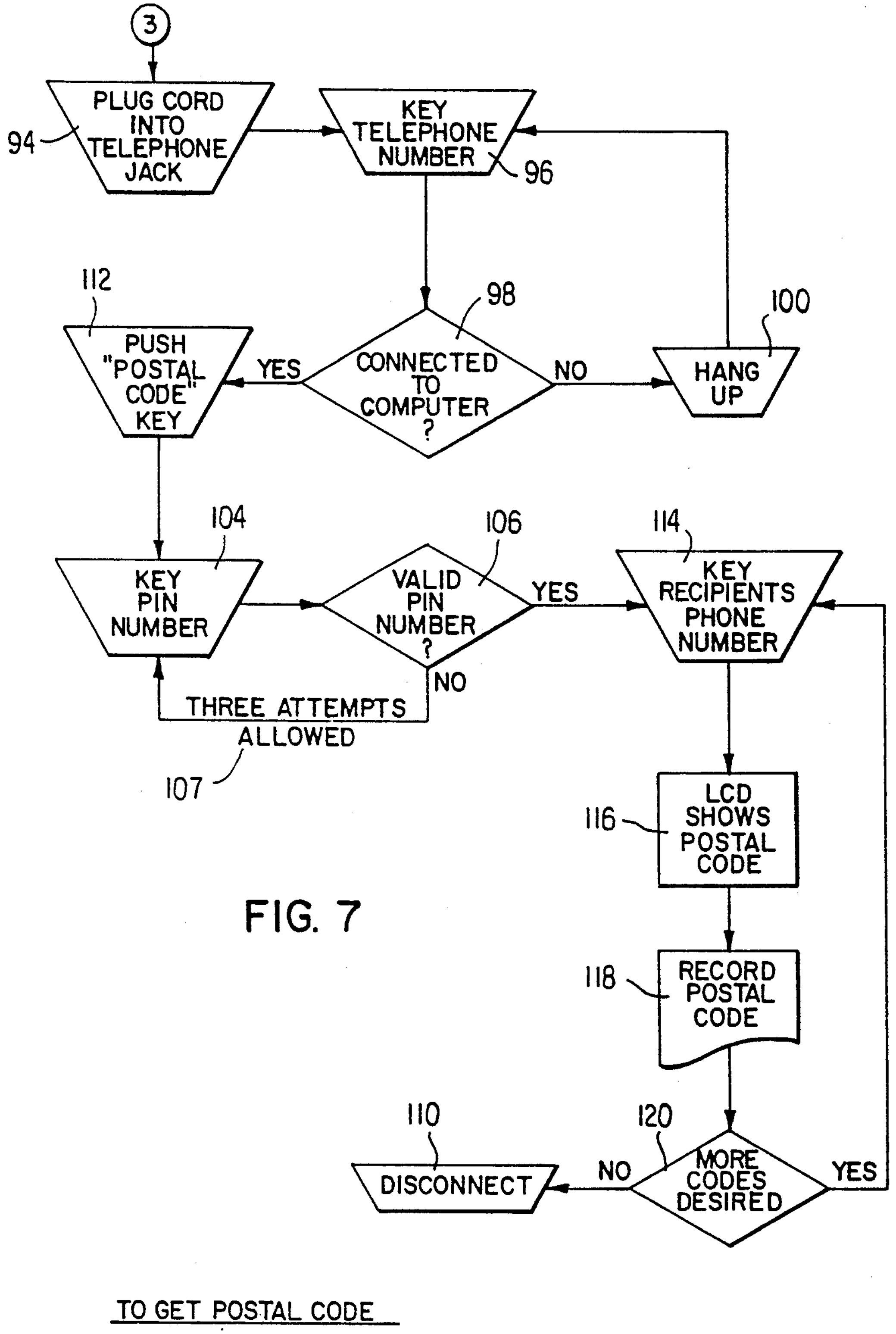

In FIG. 7, to get a postal code, the user ensures that the jack 33 is plugged in 94. Now the same processes 96, 98, 100 are followed as described in FIG. 6. Once the connection is made, the user pushes 112 the get postal code key 35 on keyboard 10. CPU 36 now prompts the user via LCD 12 to key their PIN. The user now follows processes 104, 106, 107 as described in FIG. 6. When prompted on LCD 12 the user keys the recipient's phone number 114 or address and the connected computer, via modem 32 and jack 33, sends the postal code to CPU 36 for display 116 on LCD 12. The user then records the postal code 118 for future reference. If more codes are required 120, the user repeats the process 114, 116, 118. When no more codes are required 120, the user disconnects the unit from the computer 110.

Figure 8:
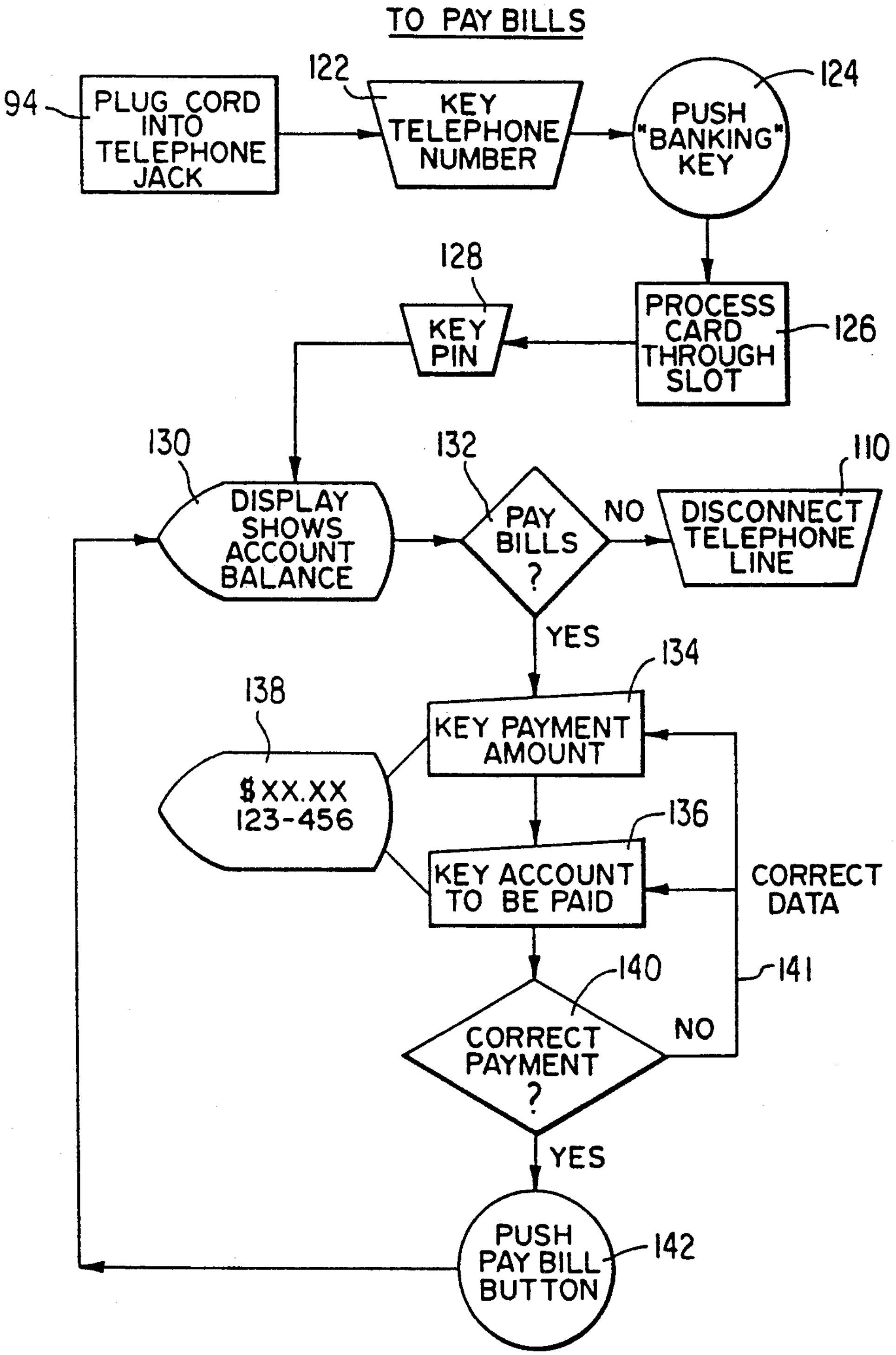

FIG. 8 shows the process to pay bills electronically via a computer in a financial institution. The user pushes the on-off switch 14 and ensures that the unit is connected 94 via telephone jack 33. The user keys in the phone number 122 of the computer on keyboard 10 which connects the unit 2 to the computer of a financial institution via modem 32 and jack 33. When CPU 36 recognizes a successful connection, the user is informed via LCD 12 and a beep via speaker 22. The user then pushes 124 the banking key 21 and follows this by running 126 a bank card through slot 11. Then their PIN is keyed 128. With this connection the computer sends the user's account balance to CPU 36 which displays it 130 on LCD 12. If the user does not want to pay bills 132, then the unit is disconnected 110. If the user wants to pay bills 132, the user keys in the amount of the payment 134 and this is displayed 138 on LCD 12 for confirmation. The user then keys in the account number of the company to be paid 136 and this is displayed 138 for confirmation. If any of these, (134, 136) is incorrect 140, the user keys in the correct number 141. When the numbers are correct 140, the pay bill button is pushed 142 on keyboard 10. CPU 36 then receives an updated account balance and displays it 130 on LCD 12. The user can then continue 132 or disconnect 110.

Thus it is apparent that there has been provided in accordance with the invention a device for accessing a central computer for banking transactions, for printing of postal codes in machine readable form and an impression of postage stamps on envelopes that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations will be apparent to those skilled in the art in light of the foregoing description. Accordingly, it is intended to embrace all such alternatives, modifications and variations as fall within the spirit and broad scope of the invention.

What I claim as my invention:

1. A device for printing an impression of postal codes and postage stamps on envelopes and for providing access to central computers for banking transactions, the device comprising:

(a) a frame having a slot to receive an envelope so that the envelope will be in position to be appropriately printed with a postal code and an impression of a postage stamp;

(b) means within the slot to indicate when the envelope is appropriately positioned within the slot for printing the postal code and an impression of a postage stamp;

(c) printing means within the frame to print a predefined postal code in a machine readable form and a variable postage amount subtracted from an electronic fund of stored postage on an envelope appropriately positioned within the slot;

(d) manually operable selection means on the frame for selecting a postal code and a postage amount;

(e) means coupled to the manually operable selection means for storing an electronic postage fund and enabling it to be appropriately added to with additional postage and subtracted from when postage is printed on an envelope;

(f) central processor unit (CPU) means associated with the manually operable selection means, postage fund storing means and printing means to control the operation thereof, the CPU means being programmed to convert postal code information fed to it from the manually operable selection means into machine readable code at the printing means;

(g) visual display means associated with the CPU means and postage fund storing means to selectively display a selected postal code, selected postage amount or balance of the fund of postage amount as desired;

(h) clock means associated with the CPU means and the printing means for generating an appropriate stamp date for the stamp being printed on the envelope;

(i) a further slot to receive a bank credit card with a magnetic strip thereon; and (j) means associated with the slot to read and store information stored on the magnetic strip, said manually operable selection means on the frame designed to further select as required account numbers, dollar amounts and authorization codes; said CPU means being coupled to the reading means, the manually operable means on the frame for selecting account numbers, dollar amounts and authorization codes, the display means and the telephone modem means, the CPU means being programmed to translate the manual selection data and transmit it to an appropriate central computer at a remote source for further processing, the visual display means as required to selectively display said manual selection data and transmitted data from said remote source.

2. A device according to claim 1 wherein the CPU means is programmed to receive an identification code, without which the device will be inoperable, the identification code being a function of a user personal identification number (PIN).

3. A device according to claim 1 wherein a telephone modem means is associated with the microcomputer whereby postage amounts may be added to the fund or postal code information may be obtained electronically from a remote source.

4. A device according to claim 1 where the CPU means is associated with memory means and arranged to provide and print a postal code dependent upon an entered telephone number.

5. A device according to claim 1 wherein a manually operable switch means is associated with the CPU to convert the device from postal code and postage stamp operation to bank credit card operation, and vice versa.

6. A device according to claim 1 wherein the manually operable selection means comprises a keyboard with alpha-numeric keys to provide corresponding alpha-numeric signals to an encoding means electronically associated with the CPU means, the CPU means programmed to translate the signals from the alpha-numeric keys and control the printing means to produce a proper impression of postal code and postage printing on the envelope.

7. A device according to claim 6 wherein the CPU is programmed to convert the alpha-numeric signals to be printed in machine readable form on the envelope.

8. A device according to claim 1 wherein the manually operable selection means comprises a keyboard with alpha-numeric keys to provide corresponding alpha-numeric signals to an encoding means electronically associated with the CPU means, the CPU means programmed to translate the signals from the alpha-numeric keys and control the printing means to produce a proper impression of postal code and postage printing on the envelope, and to control communication with a central computer.

9. A device according to claim 8 wherein the CPU is programmed to convert the alpha-numeric signals to be printed in machine readable form on the envelope.

* * * * *